(12) United States Patent
Udipi et al.

(10) Patent No.: US 9,411,757 B2
(45) Date of Patent: Aug. 9, 2016

(54) MEMORY INTERFACE

(75) Inventors: Aniruddha Nagendran Udipi, Salt Lake City, UT (US); Naveen Muralimanohar, Santa Clara, CA (US); Norman Paul Jouppi, Palo Alto, CA (US); Rajeev Balasubramonian, Sandy, UT (US); Alan Lynn Davis, Coalville, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 530 days.

(21) Appl. No.: 14/005,196

(22) PCT Filed: Mar. 14, 2011

(86) PCT No.: PCT/US2011/028357
§ 371 (c)(1),
(2), (4) Date: Sep. 13, 2013

(87) PCT Pub. No.: WO2012/125149
PCT Pub. Date: Sep. 20, 2012

(65) Prior Publication Data
US 2014/0040518 A1 Feb. 6, 2014

(51) Int. Cl.
*G06F 13/16* (2006.01)
*G06F 13/362* (2006.01)
*G06F 13/38* (2006.01)

(52) U.S. Cl.
CPC ........ *G06F 13/3625* (2013.01); *G06F 13/1605* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 5,699,520 | A | 12/1997 | Hodgson et al. |
| 6,021,464 | A | 2/2000 | Yao et al. |
| 6,049,891 | A | 4/2000 | Inamoto |
| 6,279,055 | B1 | 8/2001 | Ito et al. |
| 6,377,582 | B1 | 4/2002 | Neiger |

(Continued)

FOREIGN PATENT DOCUMENTS

| | | |
|---|---|---|
| EP | 0718770 A1 | 6/1996 |
| JP | 2004-310394 | 11/2004 |
| WO | WO-2007/105376 | 9/2007 |

OTHER PUBLICATIONS

Akesson, Benny, et al., Predator: A Predictable SDRAM Memory Controller, CODES+ISSS'07, Sep. 30-Oct. 3, 2007, Salzburg, Austria, ACM 978-1-59593-824-4/07/0009, pp. 6.
US Certificate of Correction—US686486X6 Mar. 2005, 1 Page.
PCT International Search Report/Written Opinion—Application No. PCT/US2011/028357 date Nov. 2, 2011—9 pages.

(Continued)

*Primary Examiner* — Scott Sun
(74) *Attorney, Agent, or Firm* — International IP Law Group, PLLC

(57) ABSTRACT

The present disclosure provides a method for processing memory access operations. The method includes determining a fixed response time based at least in part, on a total memory latency of a memory module. The method also includes identifying an available time slot for receiving return data from the memory module over a data bus, wherein the time difference between a current clock cycle and the available time slot is greater than or equal to the fixed response time. The method also includes creating a first slot reservation by reserving the available time slot. The method also includes issuing as read request to the memory module over the data bus, wherein the read request is issued at a clock cycle determined by subtracting the fixed response time from a time of the first slot reservation.

15 Claims, 4 Drawing Sheets

(56) References Cited

U.S. PATENT DOCUMENTS

| | | |
|---|---|---|
| 6,415,369 B1 | 7/2002 | Chodnekar et al. |
| 6,868,486 B1 | 3/2005 | Ward |
| 6,895,459 B2 | 5/2005 | Hadwiger et al. |
| 7,336,283 B2 | 2/2008 | McCormack et al. |
| 7,532,785 B1 | 5/2009 | Beausoleil et al. |
| 7,889,956 B2 | 2/2011 | Beausoleil et al. |
| 2004/0049293 A1 | 3/2004 | Hadwiger et al. |
| 2005/0080999 A1 | 4/2005 | Angsmark et al. |
| 2009/0097851 A1 | 4/2009 | Tan et al. |
| 2010/0226657 A1 | 9/2010 | Raymond et al. |
| 2012/0066432 A1* | 3/2012 | Miura .................. G06F 13/161 711/102 |

OTHER PUBLICATIONS

Fenwick, D. et al., "4. The Alphaserver 8000 Series: High-End Server Platform Development", Digital Technical Journal, vol. 7 No. 1, 1995, pp. 43-65.

Schoeberl, M. et al., "A Single-Path Chip-Multiprocessor System", Institute of Computer Engineering Vienna University of Technology, Austria, Retrieved on Apr. 7, 2016, 11 pages.

Schoeberl, M. et al., "Single-Path Programming on a Chip-Multiprocessor System", Vienna University of Technology, Austria, Retrieved on Apr. 7, 2016, 6 pages.

Schonberg, S., "Using PCI-Bus Systems in Real-Time Environments", (Research Paper), Jun. 2002, 101 pages.

* cited by examiner

MEMORY INTERFACE

BACKGROUND

In a traditional master/slave memory architecture, a processor accesses main system memory through a memory controller, which provides significant control oversight for each memory transaction. To schedule memory transactions the memory controller manages large amounts of information about the state of various components of the system like the address/command bus, data banks, and data bus, among others. During each memory read, the memory controller issues specific commands to the memory modules to micro-manage every aspect of the operation, such as row activation, column selection, bit line precharge, and the like. This puts pressure on the address/command bus in terms of performance. The memory controller also keeps track of large amounts of state for potentially hundreds of independent memory banks to provide conflict-free accesses. At appropriate times, the memory controller may also issue maintenance commands, such as DRAM refresh, for example. In heterogeneous memory systems, the memory controller may perform different maintenance requirements for different memory modules. Further, the memory controller performs arbitration between memory modules for date transfers on the shared memory bus.

It is clear that managing large memory systems is extremely complex, and requires maintaining large amounts of state, and careful coordination to complete a single transaction. This significantly increases the complexity of the memory controller. Thus, the current master-slave interface between the memory controller and memory modules with completely centralized control is not scalable and not well suited to accommodate the increasing capacities and larger bandwidth requirements desirable for future computer systems.

BRIEF DESCRIPTION OF THE DRAWINGS

Certain embodiments are described in the following detailed description and in reference to the drawings, in which.

DETAILED DESCRIPTION

Exemplary embodiments relate to systems and methods for performing memory access. Various embodiments described herein provide a packet-based memory interface between a memory controller and one or more memory modules. Various device management and memory access tasks are performed by the memory module rather than the memory controller as in traditional master/slave memory systems. Accordingly, each memory module can be more autonomous compared to memory modules in traditional master/slave memory access systems. During memory operations, the memory controller sends to the memory module an address of the memory block being requested and an indication of whether the operation is a read or a write. In an embodiment, no additional control information is used. In a read request, the memory module obtains the requested data and sends the requested data to the memory controller over a shared bus. The memory interface uses a single point of arbitration between the memory controller and the memory modules, which is implemented as one or more time slot reservations for data transfer on the shared data bus. The operations associated with a memory transaction occur lust in time to satisfy the slot reservations. The memory controller is configured to associate each read request with the return data received at the specified time slot reservation. The memory module performs each read request in fixed time such that the read response is sent to the memory controller at the reserved time slot. Working backwards in time from the data return slot, all other resources are automatically reserved for that transaction and no further arbitration is used at any stage. The techniques described herein provide for a streamlined memory access interface with reduced complexity and power consumption. Furthermore, the time slot reservation scheme can be configured to handle certain situations arising due to the intentional lack of system state knowledge at the memory controller, as described further below.

Figure 1:
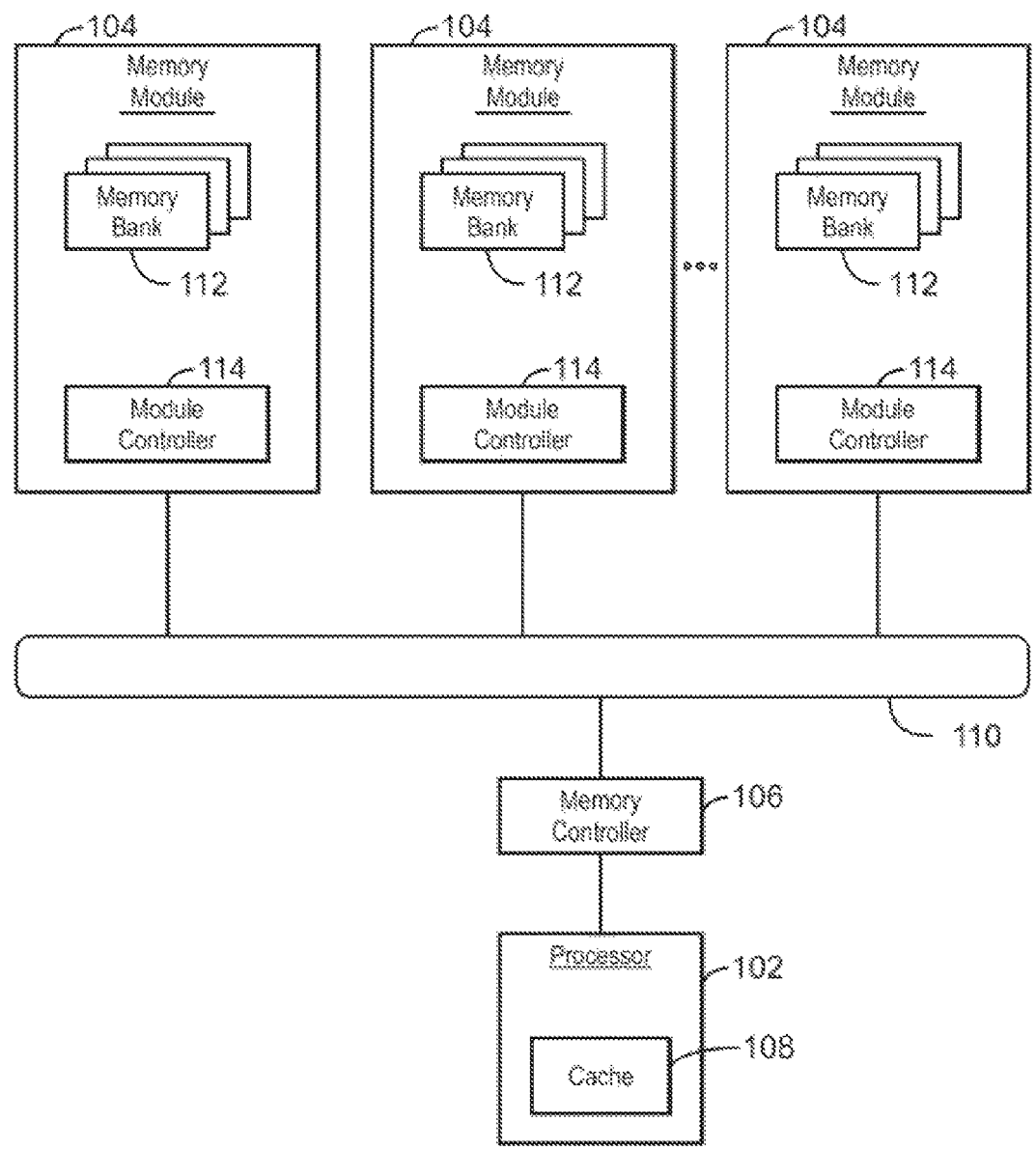
FIG. 1 is a block diagram of a memory in interface in accordance with an embodiment.

FIG. 1 is a block diagram of an example of a memory interface, in accordance with embodiments. The memory interface is referred to by the reference number 100. As shown in FIG. 1, the memory interface 100 may include a processor 102 operatively coupled to one or more memory modules 104 through a memory controller 106. The processor 102 can include one or more memory caches 108 that store frequently accessed data. In embodiments, the memory controller 106 may be integrated into the processor 102, for example, fabricated on the same die or located in the same chip package as the processor 102. In embodiments, the memory controller 106 can be a separate integrated circuit such as an Application Specific Integrated Circuit (ASIC). The memory controller 106 may be coupled to the memory modules 104 through a memory bus 110.

The memory modules 104 may be Dual-Inline Memory Modules (DIMMs) and can include any suitable type of random access memory, such as Dynamic Random Access Memory (DRAM), Synchronous Dynamic Random Access Memory (SDRAM), flash memory, and the like. Each memory module 104 may include a plurality of memory banks 112. Each memory module 104 may be associated with a total memory latency that describes the number of clock cycles between receiving a memory read request and providing the requested data. The total memory latency may be based on the number of clock cycles used for command transfer, uncontended bank access, on-chip network access, and data return. The total memory latency may be stored to a control register of each of the memory modules 104 such as a Serial Presence Detect (SPD). The total memory latency, which may be different for different memory modules 104, may be communicated to the memory controller 106. For example, during system boot-up, the total memory latency of each memory module 104 may be read from each memory module's serial presence detect and stored to one or more control registers of the memory controller 106.

The memory bus 110 may be any number of bits wide and is used to communicate address, data and commands, between the memory controller 106 and the memory modules 104. The memory controller 106 and the memory modules 104 communicate via bus packets transmitted through the memory bus 110. The memory bus 110 may include a shared request channel used to send read and write requests from the memory controller 106 to the memory modules 104. The read and write requests can include, for example, memory addresses and control data, among other information. The memory bus 110 may also include a shared response channel used to send response information back to the memory controller 106 from the memory modules 104. The response information can include, for example, the requested data or write acknowledgements, among other data. In an embodiment, the memory bus can include shared request and response channels for memory read operations, and separate shared request and response channels for memory write operations.

Each memory module 104 includes a modulo controller 114 that handles various tasks related to maintaining and accessing the memory contained in its own memory banks 112. Unlike traditional memory systems, the memory modules 104 do not rely on the memory controller 106 to send out specific requests for each low-level memory access operation, such as row activation, column selection, bit line pre-charge and the like. Instead, the module controller 114 accepts a request packet containing the memory address and takes care of these low-level memory access operations. The module controller 114 may also be configured to perform memory refresh and other memory maintenance functions such as wear leveling in flash memory. The logic that handles memory refresh and timing constraints related to memory access may be eliminated from the memory controller 106.

To perform a memory write operation, the memory controller 106 sends a write request packet to the pool of memory modules 104 over the request channel of the memory bus 110. The write request packet includes a memory address, control information indicating that operation is a write, and the data to be stored to the memory address. The write request packet may be sent to the pool of memory modules 104 in one or more clock cycles, depending on the width of the address bus and the width of the data bus. For example, in a 64-bit architecture, the memory address may be sent in two clock cycles on the dedicated address bus and the data may be sent in 8 clock cycles. Each memory module 104 decodes the write request packet and the targeted module controller 114 corresponding to the write operation processes the write request. If the addressed data block is available, the data is written to the corresponding memory address. If the data is successfully written to memory, an Acknowledgment (ACK) is returned to the memory controller 106. If the addressed data block is busy or otherwise unavailable, the targeted module controller 114 may send a Negative Acknowledgment (NACK) back to the memory controller 106. In an embodiment, memory write operations may be buffered on each memory module 104 and a NACK may be sent to the memory controller 106 if the buffer is full. If the memory controller 106 receives a NACK in response to the write request, the memory controller 106 may wait for a specified number of clock cycles and resend the write request packet.

To perform a memory read operation, the memory controller 106 sends a read request packet to the pool of memory modules 104 over the request channel of the memory bus 110. The read request packet includes the corresponding memory address and an indication that the read request is a memory read operation. Each memory module 104 in the pool decodes the read request packet, and the targeted module controller 114 processes the read request by obtaining the requested data from the memory address indicated by the read request packet. The targeted module controller 114 then sends the requested data to the memory controller 106 via a data packet over the shared response channel of the memory bus 110.

In a typical memory organization, each access to a memory bank 112 will read several cache lines and place it in the row buffer. Subsequent accesses whose addresses match the content in the row buffer are served faster compared to making a fresh read or write. This policy is called open page since the row-buffer continues to carry valid data after the original request. In an open page policy, the access time to a memory bank 112 will vary depending upon whether the memory access hits in the row buffer. This open page policy is beneficial if there is high locality in the access stream. If there is a miss in the row buffer, then an additional step of closing the original page before reading another page is performed, which increases the access line. Thus, random accesses do not generally benefit from the open page policy. In a closed page policy, the page is closed after memory access is completed and the bank prepared for the next fresh access. In an embodiment, the memory interface 100 uses a closed page policy.

To avoid bus conflicts wherein two or more memory modules attempt to access the bus 110 at the same time, the memory controller 106 conducts an arbitration procedure before sending each read request or write request. During the arbitration procedure the memory controller 106 reserves one or more time slots for receiving return data on the shared memory bus 110. Every transfer on the response channel of the memory bus 110 occurs due to an explicit request by the memory controller 106. Additionally, the closed-page memory organization offers more deterministic access latencies compared to open-page memory organization. Thus, time slots on the data bus can be reserved by the memory controller 106 based on the known total memory latency specified by each memory module 104, and a separate round of arbitration between the memory modules 104 for accessing the memory bus 110 when the return data is available may be eliminated. Furthermore, the memory controller 106 is configured to associate the data returned at a specific time slot with the specific read or write request corresponding to the reserved time slot. Thus, the use of an additional tag to correlate a read or write request of the memory controller 106 with the corresponding return data of the memory modules 104 may be eliminated.

In some cases, data may not be read from memory in time to send the data to the memory controller 106 at the corresponding time slot reservation. For example, a bank conflict may occur if a read request references a memory bank 112 that is currently involved in processing a previous read request in which case the second read request cannot start until after the first read request has completed. In such cases, the additional latency added by the unavailability of the memory bank 112 may cause the response to the second read request to miss the corresponding time-slot reservation. Other events may also cause the read response to miss its time-slot reservation deadline, such as if the memory bank 112 had been involved in a periodic refresh operation or in a low-power sleep mode at the time that the read request arrived. The memory controller 106 will not have information enabling it to anticipate possible bank conflicts or other delays, because the memory controller 106 does not deal with the minutiae of per-bank state.

If the requested data is unavailable at the reserved time slot, the targeted module controller 114 may return a NACK to the memory controller 106 at the reserved time-slot. In an embodiment, the memory controller 106 may resend the read request packet if a NACK is received at the specified time slot, for example, after a specified time delay. In an embodiment, the slot reservation scheme employed by the memory controller 108 is configured to handle cases wherein the data to be returned by the memory module 104 is not available in time to be returned at the corresponding time slot reservation. For example, the memory controller 106 may reserve two time slots for each read request sent to the pool of memory modules 104. The second time slot reservation may be used if the data was not available at the first time slot reservation. The slot reservation scheme may be better understood with reference to FIG. 2.

Figure 2:
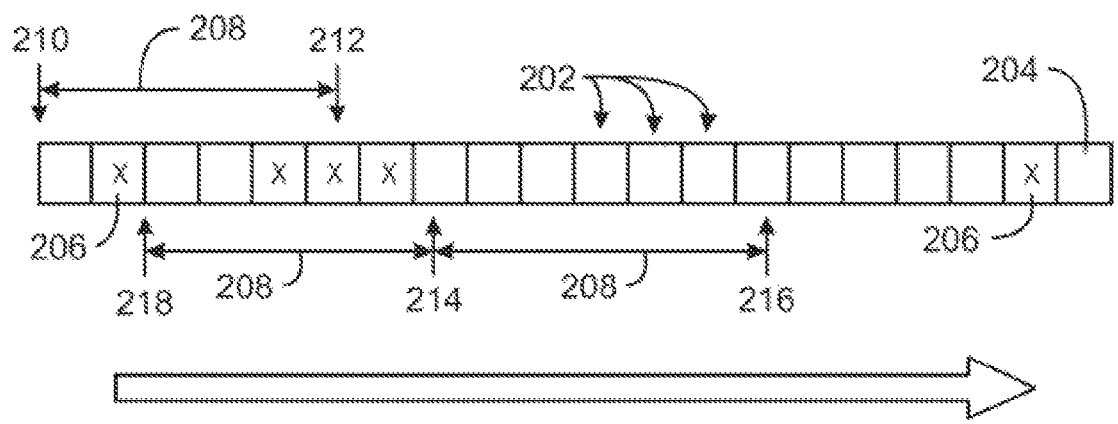
FIG. 2 is a timing diagram showing a slot-based resource allocation, in accordance with an embodiment.

FIG. 2 is a timing diagram showing a slot-based resource allocation, in accordance with an embodiment. The timing diagram is referred to by the reference number 200. The timing diagram 200 shows a series of time slots 202 representing data flow on the shared data bus. Each time slot 202 corresponds to one or more clock cycles during which data may be returned from the memory modules 104 (FIG. 1) to the memory controller 106. The width of each time slot 202, in terms of clock cycles, may be determined based on the size of the cache line and the width of the response channel. For example, with 64-byte cache lines and a 64-bit response channel, each read request may be serviced every four cycles, assuming a fully pipelined data bus, with dual data rate transmission. Unoccupied time slots 204, shown as an empty box, represent time slots 202 that are not presently reserved. Occupied time slots 206, shown as a box with an "X," represent time slots 202 that are presently reserved as a result of a previous read request or write request.

Read requests issued by the processor 102 (FIG. 1) may be stored to a read request queue maintained by the memory controller 106. To process a read request obtained from the queue, the memory controller 106 arbitrates for one or more time slots 202, which may be used receiving the return data. In the present example, two time slots 202 are reserved. However, it will be appreciated that any suitable number of time slots 202 may be reserved, including one, two, three, or more. The available time slots 202 may be identified and reserved before sending the read request to the pool of memory modules 104.

As discussed above, the memory controller 106 receives information regarding the total memory latency of each memory module 104. In embodiments, the total memory latency of each memory module 104 is used to determine a fixed response time for each memory module 104. The fixed response time specified for each memory module 104 may be equal to or greater than the total memory latency at the memory module 104. The fixed response time determined for each memory module 104 may be communicated back to the each corresponding memory module 104 and stored to a control register, for example, during a timing configuration stage, which may take place at system boot-up. In an embodiment, the fixed response time may be equal to the total memory latency specified by the memory modules 104, in which case the communication of the fixed response time back to the memory modules may be skipped and the total memory latency specified by the memory module 104 may be used as the fixed response time. The fixed response time may be expressed as a number of clock cycles that is greater than or equal to the total memory latency of the memory module 104. The fixed response time may be used by the memory controller 106 to identify and reserve time slots for receiving return data from the memory modules 104. The fixed response time may be used by each memory module 104 to determine when to respond to a specific read request. The fixed response time is indicated in FIG. 2 by the reference number 208.

As shown in FIG. 2, a read request may be obtained from the queue at time 0, indicated by arrow 240. To identify available time slots 202, the memory controller 106 identifies the first available time slot 202 that is at least one fixed response time away from time 0, the time at which the read request is obtained from the queue. As shown in FIG. 2, the time slot 202 at the fixed response time away from time 0, indicated by arrow 212, is reserved. Thus, the next available time slot, indicated by arrow 214, is selected for the first slot reservation.

Additionally, a second available time slot is identified as the first available time slot 202 that is at least one fixed response time away from the first slot reservation. The time slot 202 identified for the second slot reservation, shown by the arrow 216, is unoccupied and may thus be used for the second slot reservation. If the time slot 202 had been occupied, the next available time slot 202 could have been identified for the second slot reservation, and the first slot reservation could have been moved up by the same number of time slots, to keep the distance between the first slot reservation and the second slot reservation equal to the fixed response time 208. Further, although the time interval between the first and second time slot reservations is equal to the fixed response time 208, it will be appreciated that in an embodiment, the interval between the first slot reservation and the second slot reservation could be any suitable interval and may be larger or smaller than the fixed response time, it will also be appreciated that the second slot reservation may be positioned less than one total memory latency away from the first slot reservation. If the time interval between the first and second time slot reservations is not equal to the fixed response time, then a second fixed response time may be specified for second slot reservations and communicated to the memory modules 104 during the time configuration stage.

Upon identifying two available time slots 202 that may be used for return data, the memory controller 106 reserves the identified time slots so that the time slots cannot be used for subsequent read requests. The first time slot reservation, indicated by arrow 214, may be referred to herein as "Slot 1," and the second time slot reservation, indicated by arrow 216, may be referred to herein as "Slot 2." The memory controller 106 then issues the read request to the pool of memory modules 104 through the memory bus 110 at a clock cycle determined based on the first slot reservation and the fixed response time. For example, the read request may be issued at a clock cycle determined by subtracting the fixed response time 205 from a time of the first slot reservation, as indicated by arrow 214. In this way, the positions of the time slot reservations are a known number of time slots away from the issued read request, and the return data will arrive on the shared bus at the times of the slot reservations. In an embodiment, the times of the first slot reservation (indicated by arrow 214) and the second slot reservation (indicated by arrow 216) are not communicated to the memory modules 104 with the read request packet.

The memory controller 106 associates Slot 1 214 and Slot 2 216 with the read request, so that when data is returned at these time slots, the data can be directed to the appropriate cache line of the processor 102. The return data may include the requested data, in other words, the data at the memory address identified by read request. If the targeted memory bank 112 was busy or it for any other reason the corresponding memory module 104 is unable to return the requested data in Slot 1 214, the return data returned by the memory module 104 in Slot 1 214 may include a negative acknowledgement (NACK). The requested data may then be returned in Slot 2 216, by which time the requested data will likely be available in most circumstances. In most cases, the requested data will be returned at Slot 1 214.

In embodiments, the memory controller 106 may be configured such that if the requested data is returned in Slot 1 214, the reservation of Slot 2 216 may be cleared, making it available for a subsequent read request. Thus, reservation of Slot 2

216 will not have a significant effect on the overall effective bandwidth of the memory interface 100. By placing Slot 2 216 at least one total memory latency away from Slot 1 214, the reservation of Slot 2 216 may be cleared in time to make it available for subsequent read requests. Such a time gap between Slot 1 214 and Slot 2 216 may result in some additional latency for Slot 2 216 returns, but makes it less likely that Slot 2 216 will be wasted.

In some cases, a long series of read or write requests may all be targeted at the same bank. In this case, the memory module 104 may be unable to return the requested data in either Slot 1 214 or Slot 2 216, because memory accesses will be spaced apart by a time equal to the bank access time. If the memory module 104 is unable to return data in Slot 1 214 or Slot 2 216, NACKs may be returned in both Slot 1 214 and Slot 2 216, and the read request may be retried by the memory controller 106 at a future time. In an embodiment, the request is pushed to the back of the read request queue maintained by the memory controller 106. In an embodiment, the memory controller 106 may wait for a fixed time, arbitrate for a new set of time slots 202 and reissue the read request. This process can potentially be repeated multiple times, consuming resources in the form of queue occupation, wasted time slots 202, and address re-transmission energy, but is expected to be infrequent enough to not impact overall performance in any significant way.

Figure 3:
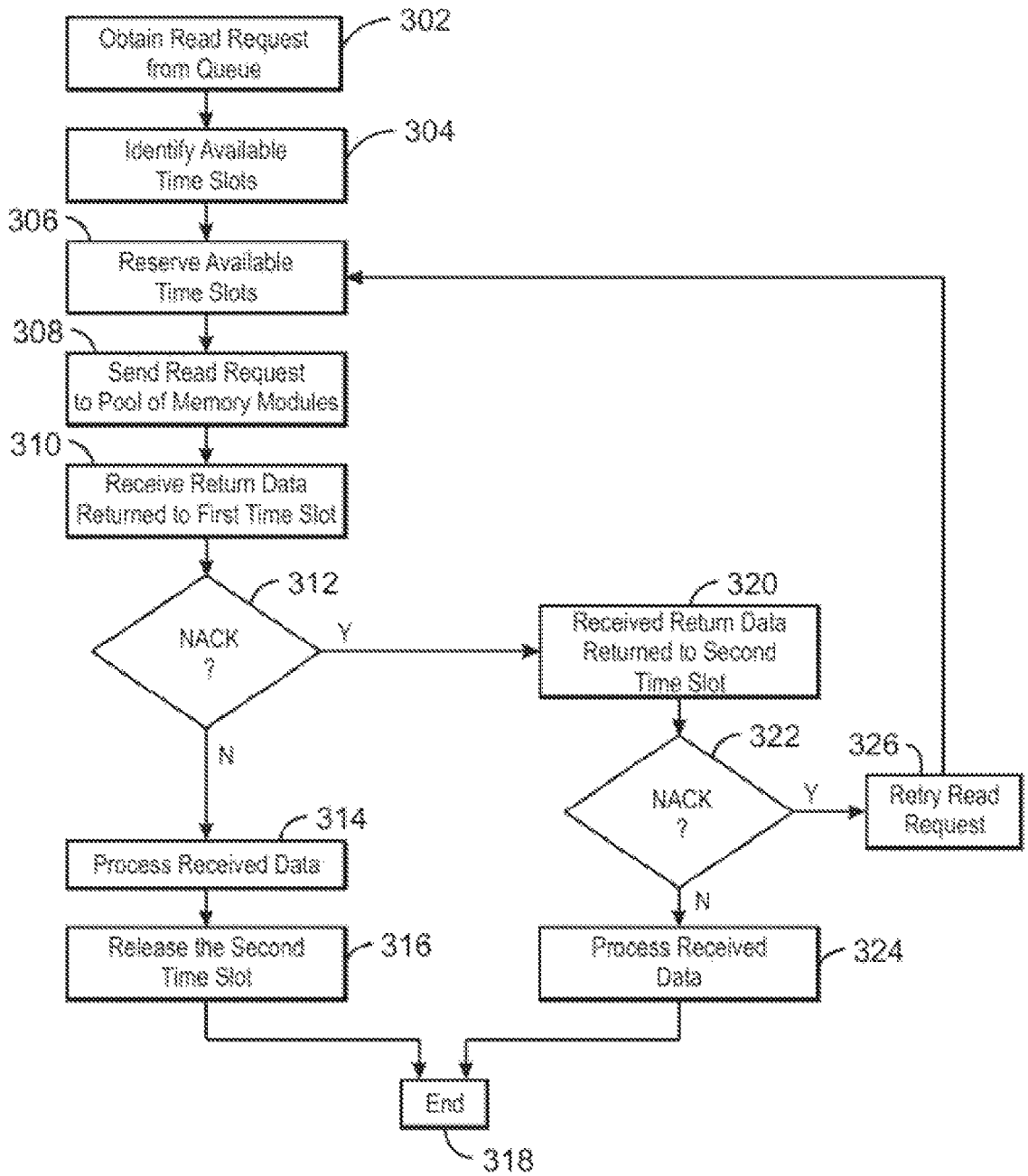
FIG. 3 is a process flow diagram of a method of processing memory read requests, in accordance with an embodiment.

FIG. 3 is a process flow diagram of a method of processing memory read requests, in accordance with an embodiment. The method is referred to by the reference number 300 and may be implemented by the memory controller 106 of FIG. 1. The method may begin at block 302, wherein a read request is received from the queue. At block 304, the memory controller identifies available time stets, as described above. The available time slots are the nearest unoccupied time slots that are beyond the fixed response time specified for the memory module that holds the data.

At block 306, the memory controller reserves the identified time slots so that the time slots cannot be used for subsequent read requests. The reservation of the time slots ensures that no other read request can be issued during a cycle at which the return data would be expected to return at the reserved time slots.

At block 308, the memory controller issues the read request packet on the memory bus. The identification of the available time slots at block 304 determines the cycle at which the read request packet is issued. In other words, the read request packet is issued at the cycle at which the return data will return at the time slots identified at block 304. The first reserved time slot will be beyond the issuance cycle by the number of cycles indicated b the fixed response time for the targeted memory module. The second reserved time slot is beyond first reserved time slot by the number of cycles indicated by the fixed response time for the targeted memory module.

At block 310, data is received by the memory controller at the first reserved time slot. The data may be the requested data or an indication, such as a NACK, that indicates the memory module 104 was unable to return the requested data at the first time slot.

At block 312 a determination is made regarding whether a NACK was returned at the first reserved time slot. If a NACK was not returned at the first reserved time slot, the process flow may advance to block 314, wherein the returned data is processed.

At block 314, the return data is processed by sending the requested data to the processor cache line associated With the read request packet issued at block 308. At block 316, the reservation of second reserved time slot is cleared making the time slot available for subsequent read requests. The process flow may then advance to block 318 and the process terminates.

If at block 312, a NACK is returned at the first reserved time slot, the process flow may advance to block 320. At block 320 return data is received at the second reserved time slot. At block 322, a determination is made regarding whether a NACK was received at the second reserved time slot. If a NACK was not received, the process flow may advance to block 324. At block 324, the return data is processed by sending the requested data to the processor cache line associated with the read request packet issued at block 308.

It at block 322, a second NACK was returned at the second reserved time slot, the process flow may advance to block 326 and the read request may be retired at a later time, for example, after a time delay specified by the memory controller 106 for such instances. The process flow may then return to black 304, wherein a new set of time slots may be identified for the new request packet.

Figure 4:
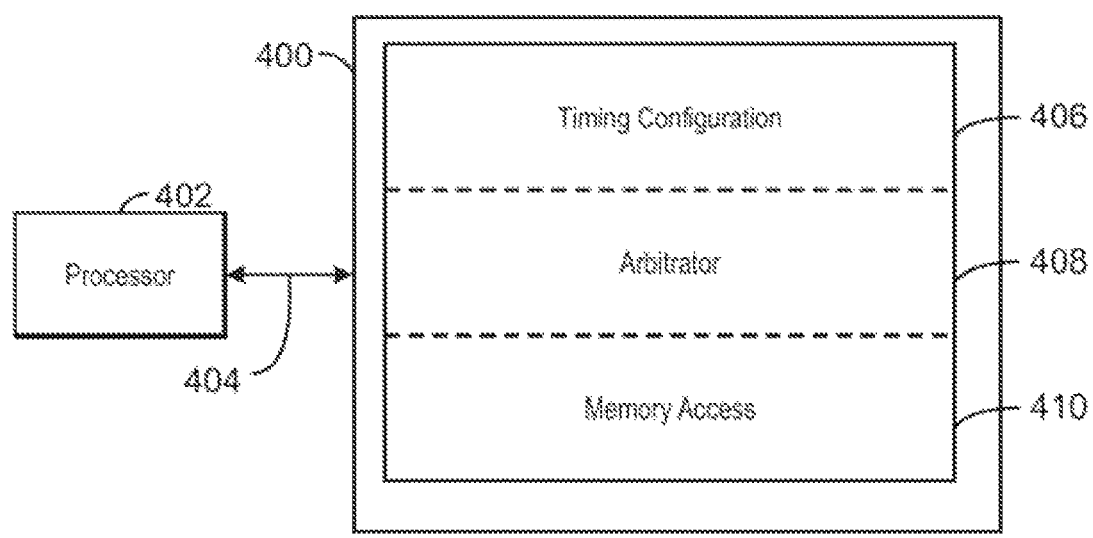
FIG. 4 is a block diagram showing a non-transitory, computer-readable medium that stores code for implementing a memory interface, in accordance with an embodiment.

FIG. 4 is a block diagram showing a non-transitory, computer-readable medium that stores code for implementing a memory interface, in accordance with an embodiment. The non-transitory, computer-readable medium is generally referred to by the reference number 400. The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of nonvolatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices. The non-transitory, computer-readable medium 400 may also be an Application Specific Integrated Circuit (ASIC).

A processor 402, which may be the processor 102 or a separate memory controller 106 as shown in FIG. 1, generally retrieves and executes the instructions stored in the non-transitory, computer-readable medium 400 to process memory operations in accordance with embodiments of the memory interface describe herein. In an embodiment, the tangible, machine-readable medium 400 can be accessed by the processor 402 over a computer bus 404. A first region 406 may include a timing configuration module configured to determine a fixed response time of a memory module based, at least in part, on a total memory latency at the memory module.

A second region 408 may include an arbitrator configured to identify and reserve time slots for receiving return data corresponding to a read request. The arbitrator may identify an available time slot for receiving return data corresponding to a read request, wherein the time difference between a current clock cycle and the available lime slot is greater than or equal to the fixed response time. The arbitrator then creates a first slot reservation by reserving the available time slot. In an embodiment, the arbitrator also identifies a second available time slot tor receiving return data corresponding to the read request and creates a second slot reservation by reserving the second available time slot The time interval between the first slot reservation and the second slot reservation may be equal to the fixed response time.

A third region 410 may include a memory access interface configured to issue the read request to the memory module. The read request may be issued at a clock cycle determined by subtracting the fixed response time from a time of the first slot reservation. In an embodiment, none of the slot reservations are communicated to the memory module with the read request packet. Because the memory module is configured to respond to the read request at the fixed response time. The return data will arrive on the shared bus at the first slot reservation. The return data may include the data requested by the read request or an indication that the data was unavailable at the time specified by the fixed response time. The memory access interface associates the return data returned at the first slot reservation with the corresponding read request. Additionally, if the return data returned at the first slot reservation is the data identified by the read requested, the memory access interface may clear the second slot reservation.

Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. A method of operating a memory module, comprising:
   determining a fixed response time based, at least in part, on a total memory latency of the memory module;
   identifying an available time slot for receiving return data from the memory module over a data bus, wherein the time difference between a current clock cycle and the available time slot is greater than or equal to the fixed response time:
   creating a first slot reservation by reserving the available time slot; and
   issuing a read request to the memory module over the data bus, wherein the read request is issued at a clock cycle determined by subtracting the fixed response time from a time of the first slot reservation.

2. The method of claim 1, wherein the memory module is configured to send the return data to the data bus at a deadline corresponding to the fixed response time.

3. The method of claim 1, comprising matching the return data to the corresponding read request based on receiving the return data at the fixed response time.

4. The method of claim 1, wherein the first slot reservation for receiving the return data from the memory module is not communicated to the memory module.

5. The method of claim 1, comprising creating a second slot reservation by identifying and reserving a second available time slot later in time than the first slot reservation, wherein second return data corresponding to the read request is received at the second slot reservation if the memory module is not able to return requested data indicated by the read request in time for the requested data to arrive at the first slot reservation.

6. The method of claim 5, wherein a time interval between the first slot reservation and the second slot reservation is equal to the fixed response time.

7. A system, comprising:
   a pool of memory modules operatively coupled to a memory controller through a shared bus, wherein the memory controller is configured to determine response times of each of the memory modules based, at least in part, on a total memory latency of each of the memory modules, and wherein the memory controller is configured to issue a read request to a target memory module of the pool of memory modules by:
   identifying an available time slot for receiving return data corresponding to the read request, wherein the time difference between a current clock and the available time slot is greater than or equal to the fixed response time of the target memory module;
   creating a first slot reservation by reserving the available time slot; and
   issuing a read request over the shared bus, wherein the read request is issued at a clock cycle determined based on the fixed response time such that the return data will arrive on the shared bus at the first slot reservation.

8. The system of claim 7, wherein each of the memory modules comprises a module controller configured to obtain requested data from a memory address indicated by the read request.

9. The system of claim 8, wherein the module controller sends the return data comprising the requested data to the shared bus at the fixed response time of the target memory module if the requested data is available within the fixed response time.

10. The system of claim 8, wherein the module controller sends the return data comprising a negative acknowledgment to the shared bus at the fixed response time of the target memory module if the requested data is unavailable within the fixed response time.

11. The system of claim 7, wherein the rues controller is configured to match the return data returned by the target memory module at the first slot reservation to the corresponding read request.

12. The system of claim 7, wherein the memory controller is configured to create a second slot reservation for the read request, wherein the time interval between the first slot reservation and the second slot reservation is equal to the fixed response time.

13. A non-transitory, computer-readable medium comprising code configured to direct a processor to:
   determine a fixed response time of a memory module based, at least in part, on a total memory latency of the memory module;
   identify an available time slot for receiving return data corresponding to a read request, wherein the time difference between a current clock cycle and the available time slot is greater than or equal to the fixed response time;
   create a first slot reservation by reserving the available time slot; and
   issue the read request to the memory module, wherein the read request is issued at a clock cycle determined by subtracting the fixed response time from a time of the first slot reservation.

14. The non-transitory, computer-readable medium of claim 13 comprising code configured to direct the processor to associate the return data returned at the first slot reservation with the read request; wherein the first slot reservation is not communicated to the memory module.

15. The non-transitory, computer-readable medium of claim 13, comprising code configured to direct the processor to:
   identify a second available time slot for receiving return data corresponding to the read request,
   create a second slot reservation by reserving the second available time slot.

* * * * *